(12) United States Patent
Jones et al.

(10) Patent No.: US 8,823,746 B2
(45) Date of Patent: Sep. 2, 2014

(54) SYSTEM AND METHOD FOR MOTION BLUR USING VELOCITY VECTORS

(75) Inventors: Chad E. Jones, Davis, CA (US); Assana M. Fard, Sunnyvale, CA (US); Christopher Wright, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 701 days.

(21) Appl. No.: 13/035,872

(22) Filed: Feb. 25, 2011

(65) Prior Publication Data

US 2012/0092376 A1    Apr. 19, 2012

Related U.S. Application Data

(60) Provisional application No. 61/394,704, filed on Oct. 19, 2010, provisional application No. 61/430,793, filed on Jan. 7, 2011.

(51) Int. Cl.
| | | |
|---|---|---|
| G09G 5/00 | (2006.01) | |
| G09G 5/02 | (2006.01) | |
| G06K 9/00 | (2006.01) | |
| G06K 9/40 | (2006.01) | |
| G06F 3/0481 | (2013.01) | |

(52) U.S. Cl.
CPC .................................. G06F 3/0481 (2013.01)
USPC ............ 345/647; 345/589; 382/162; 382/264

(58) Field of Classification Search
CPC ... G06T 7/0014; G06T 15/005; G06T 15/503; H04N 5/144; H04N 5/23254; H04N 19/00127; H04N 19/00751; H04N 7/0135

USPC ........................... 345/647, 589; 382/162, 264
See application file for complete search history.

(56) References Cited

U.S. PATENT DOCUMENTS

| | | | |
|---|---|---|---|
| 7,193,629 B2 * | 3/2007 | Kake et al. ..................... 345/581 |
| 7,227,896 B2 * | 6/2007 | Sun .......................... 375/240.16 |
| 7,248,265 B2 | 7/2007 | Zimmer | |
| 7,257,271 B2 * | 8/2007 | Adams et al. ................. 382/275 |
| 7,561,186 B2 | 7/2009 | Poon | |
| 7,616,220 B2 | 11/2009 | Baxter | |
| 7,643,019 B2 | 1/2010 | Velthoven et al. | |
| 7,750,897 B2 | 7/2010 | Nishi et al. | |
| 2009/0245639 A1 | 10/2009 | Erdler et al. | |
| 2010/0026880 A1 * | 2/2010 | Ito et al. ........................ 348/352 |
| 2010/0284470 A1 * | 11/2010 | Nakaya .................... 375/240.16 |

* cited by examiner

*Primary Examiner* — Kee M Tung
*Assistant Examiner* — Haixia Du
(74) *Attorney, Agent, or Firm* — Wong, Cabello, Lutsch, Rutherford & Brucculeri, LLP (57) ABSTRACT

A system and method for applying motion blur to an application window. Motion blur may be applied to pixel in a window by calculating a velocity vector for each pixel in the window with reference to velocity vectors calculated for each corner of the window. Motion blur may be implemented by placing a number of blur samples in a frame along the pixel velocity vector according to the size of the pixel vector, or by directionally downsampling then re-upsampling the content of the window. For a frame having multiple windows, the motion blur for each window may be determined independent of the motion of other windows or as a composite for windows moving together. According to an embodiment, for each pixel in the frame, the associated application window may be identified and the pixel blurred with reference to the corner velocities of the associated application window.

24 Claims, 10 Drawing Sheets

FIG. 9

SYSTEM AND METHOD FOR MOTION BLUR USING VELOCITY VECTORS

RELATED APPLICATIONS

This application claims benefit under 35 U.S.C. §119(e) of U.S. Provisional Application Nos. 61/394,704, filed Oct. 19, 2010; and 61/430,793, filed Jan. 7, 2011, each of which is incorporated herein by reference in its entirety.

BACKGROUND

Aspects of the present invention relate generally to the field of image display and processing, and more specifically to motion blur for image movement.

Motion blur is a graphics processing operation applied to image content to improve the aesthetic appeal of content that contains objects in motion. Computer systems conventionally display graphical content in "frames," static images that are rendered in sequence on a display device. Image data corresponding to movement may be separated into a sequence of still images comprising a series of frames, each frame representing an intermediate still image of the object in motion.

Motion blur can improve the appeal of moving content by applying a blur effect on the content as it is rendered in multiple static images across corresponding multiple frames. However, applying blur effects is a processing intensive feature that consumes resources that could be spent on other system tasks. Additionally, applying blur effects dynamically in real time such that the blur effect is applied responsive to the type of motion being applied presents additional difficulties in accurate motion calculation and resource utilization. Accordingly, there is a need in the art for an image display system capable of rapidly and efficiently applying blur effects to images in motion across a plurality of frames.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Embodiments of the present invention provide an improved system and method for blurring the pixels of an application window in motion between frames. Calculating a velocity vector for each corner of an application window exhibiting motion between a plurality of frames, to calculate a velocity vector for each pixel in the window with reference to the calculated corner vectors, efficiently and accurately blurs the pixels in a display frame. Additionally, the total motion blur between two frames may be implemented incrementally in a series of intermediate frames, thereby providing a gradual and smooth blur effect. For a frame having multiple application windows, the motion blur for each window may be determined independent of the motion of other windows or may be determined as a composite for windows moving together. Or, for each pixel in the frame, an associated application window may be identified and then the pixel blurred with reference to the corner velocities of the associated application window, thereby avoiding calculating motion blur for any obscured or hidden portions of the application window. Thus, motion blur may be efficiently applied to the pixels of the display frame in accordance with the system and method described herein.

Figure 1:
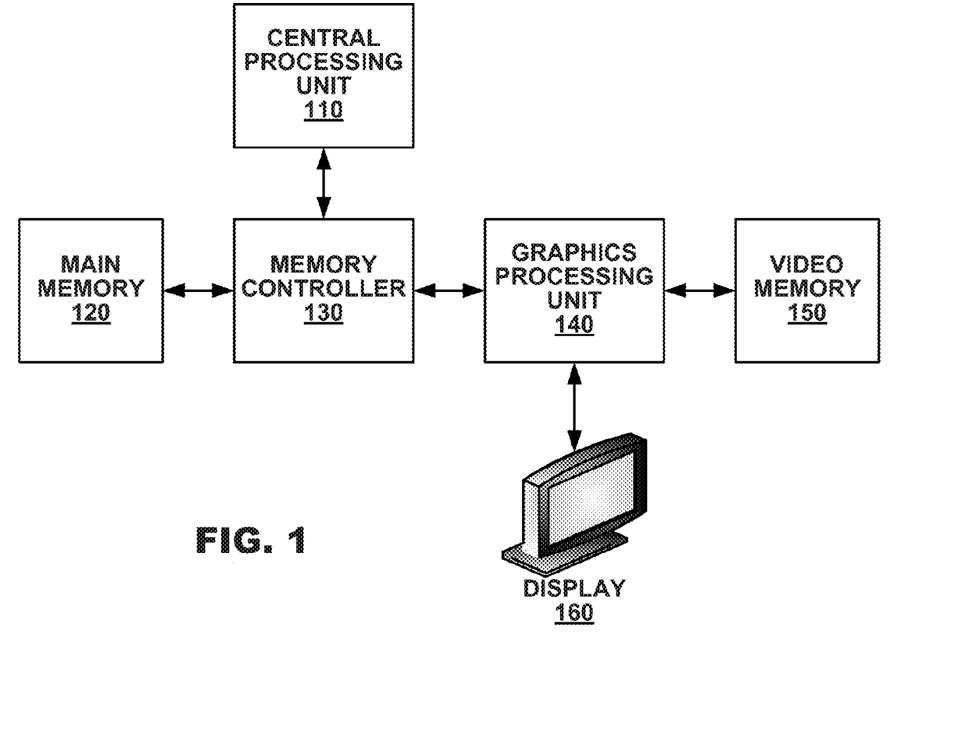
FIG. 1 is a simple block diagram illustrating components of an exemplary computer system according to an embodiment of the present invention.

FIG. 1 is a simple block diagram illustrating components of an exemplary computer system 100 according to an embodiment of the present invention. The system 100 may include a central processing unit (CPU) 110, a main memory 120, a memory controller 130, a graphics processing unit (GPU) 140, a video memory 150 and a display 160. The CPU 110 may be a processor implemented to execute program instructions. The program instructions may include the operating system for system 100 and a plurality of application programs that may be instantiated by the user of system 100. The program instructions may be executed in a single CPU 110 or across a plurality of processors (not shown). The main memory 120 may store program instructions for the operating system and application programs and data for the computer system 100. Main memory 120 may be any data storage device capable of storing program instructions to be run on the CPU 100 including a hard disk drive or solid-state drive. The memory controller 130 may manage access to the main memory 120 by the CPU 110, GPU 140 and other system devices, not shown. The GPU 140 may perform graphics processing operations to support display functions of the system 100. The video memory 150 may be a data storage device implemented to store graphics data generated by the GPU 140 including random access memory (RAM) or flash memory. The display 160 may output video data provided by the GPU 140. The display 160 may be a monitor, screen, or other visual output device used for viewing graphical images.

Each of the illustrated memory devices in the system have been described with exemplary data storage devices, a memory device may be implemented with any applicable data storage device. Data storage devices may be any computer readable medium, including for example volatile storage such as RAM or non-volatile storage such as ROM, solid state drives or other flash memory device, magnetic disks, or optical disks.

Figure 2:
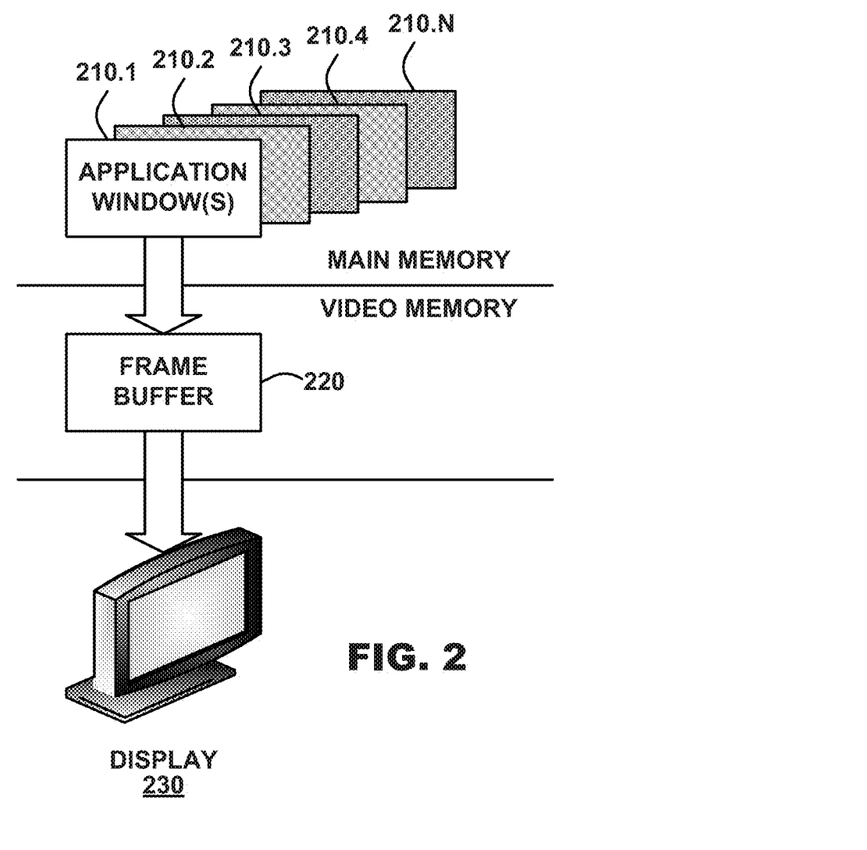
FIG. 2 is a functional block diagram illustrating an exemplary pipeline of graphical output that may be generated by an exemplary computer system according to an embodiment of the present invention.

FIG. 2 is a functional block diagram illustrating a pipeline 200 of graphical output that may be generated by computer system 100 according to an embodiment of the present invention. Graphical output may proceed through multiple stages and may include a plurality of application windows 210.1-

210.N stored in the main memory 120. The images corresponding to the plurality of application windows 210.1-210.N as displayed over time may be stored as a plurality of frames in a frame buffer 220 when they are prepared for display. The frame buffer 220 may be stored in video memory 150 and managed by the GPU 140. The plurality of frames comprising the plurality of application windows 210.1-210.N may then be displayed on a display 230. The display may be managed by a display driver (not shown).

Frames for the application windows 210.1-210.N may be constructed by applications stored in the main memory 120 and executed by the CPU 110 in conjunction with the operating system. The CPU 110 may define the content of each application window as it executes the applications. In conventional image processing systems, a frame of an image may be divided into pixels for ease of processing. Each frame for an application window 210 may then be defined as a bitmap comprising a plurality of pixels.

As previously noted, the GPU 140 may manage the frame buffer 220 stored in the video memory 150. The GPU 140 may retrieve data for the application windows 210.1-210.N from main memory 120 and build a displayable frame for each application window 210. To build a displayable frame, the GPU 140 may perform graphics processing operations on the frame data including texture mapping, polygon rendering, shading, digital filtering, and applying the motion blur effects as described herein. Once the completed frame is fully processed, it may be output to the display 230. The GPU 140 may build a new frame on each refresh cycle of the display 230.

According to an embodiment of the present invention, the GPU 140 may apply motion blur effects to application window content based on motion that is detected at each window. Motion may be imparted on an application window through a variety of events, including the revealing or concealing of a window, the resizing of a window, the user's interaction with a window, or on the direction of the application. For example, a window may become hidden or revealed through operator interaction with application windows via the operating system or through alarms or other notifications generated by applications. A window may be resized by maximizing windows, tiling them, cascading them, rearranging them to expose all active windows, or restoring them from a previous state. Operators may impart movement on application windows by moving them via drag-and-drop operations. Or an application program may impart movement on their own application windows by dynamically resizing them in response to triggering conditions defined by the program or program data. For example, some media players may require automatic resizing of an application window to fit an image size of a video to be played.

The GPU 140 may apply motion blur effects to image content stored in the frame buffer 220. Image content stored in the frame buffer may be discarded after the frame is passed to the display 230. Then, frame buffer content may be newly generated for each refresh cycle of the display 230, and the induced motion blur may be discarded after being applied to a frame that was displayed. Thus the effects of the motion blur may not extend to any application window 210 stored in the main memory 120.

Figure 3:
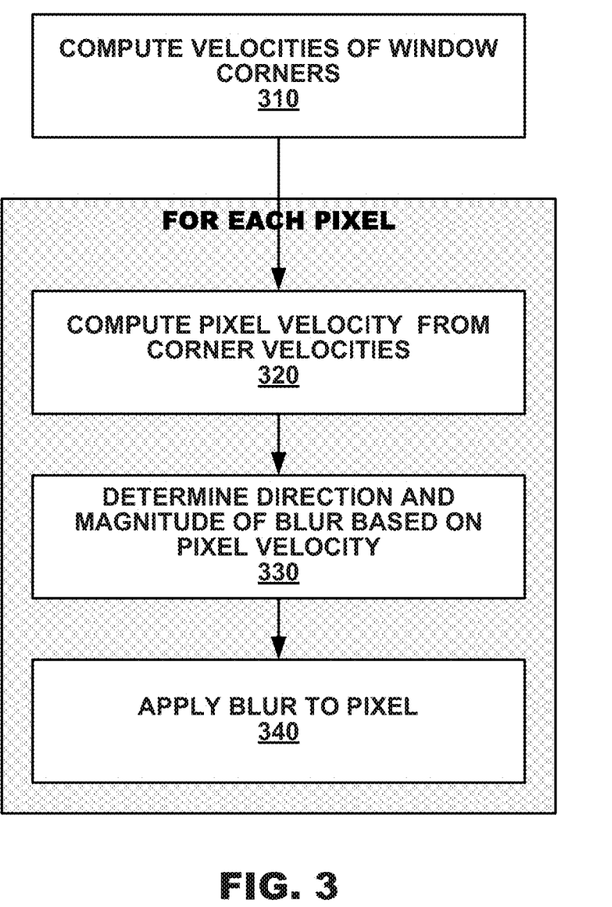
FIG. 3 illustrates a method for applying motion blur according to an embodiment of the present application.

FIG. 3 illustrates a method for applying motion blur, according to an embodiment of the present invention. The method 300 may be applied to each application window rendered in a frame for display. At the outset, the method 300 may compute the velocities of the corners of the application window (box 310). The velocities may be computed based on the positions of each corner in a present frame as compared to a prior frame. The computed velocities of each corner may then be converted into a motion vector (MV) for each corner. The motion vector may be a velocity vector having a direction and a magnitude that represents the motion of the application window corner between two frames.

Thereafter, the method may process each pixel within the application window. For each pixel within the application window, the method 300 may compute the pixel's velocity as an extrapolation of the velocities of the application window's corners (box 320). The velocity of each pixel may also be expressed as a motion vector. Motion vectors of individual pixels within the application window based on the motion vectors $MV_1$-$MV_4$ derived for each corner may be calculated in accordance with Equation 1 where $D_1$-$D_4$ represent distances from the pixel P to each of the four corners of the application window and $D_{MAX}$ is the largest of distances $D_1$-$D_4$.

$$MV_p = \frac{\sum_{i=1 \text{ to } 4} MV_i \cdot D_i}{D_{MAX}} \quad \text{(Eq. 1)}$$

Based on the pixel's velocity expressed as the motion vector, the method 300 may then determine a direction and magnitude of blur to be applied to the pixel (box 330). Finally, the method 300 may apply the determined blur to the pixel (box 340). The determined motion blur may be applied to each pixel in a direction and magnitude that corresponds to the direction and magnitude of the pixel's motion vector $MV_p$.

Figure 4:
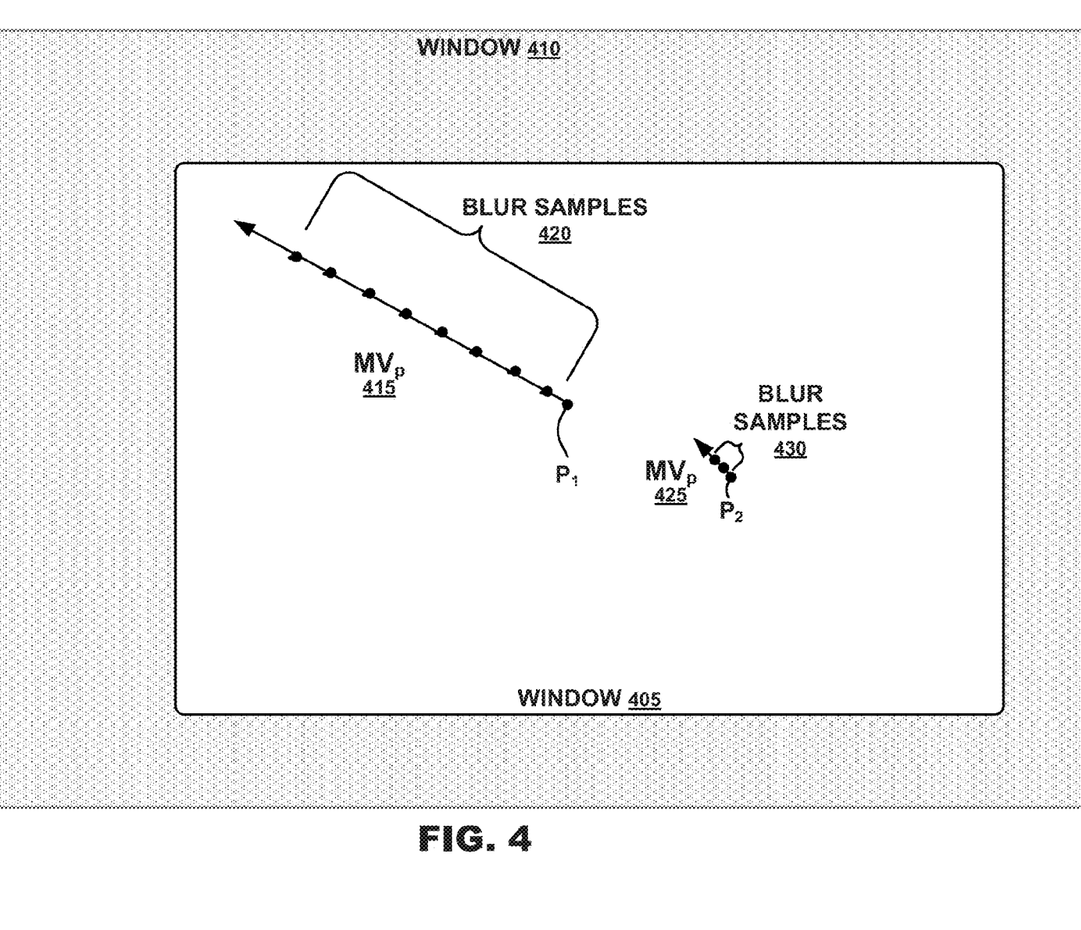
FIG. 4 illustrates an exemplary placement of blur samples according to an embodiment of the present invention.

FIG. 4 illustrates an exemplary placement of blur samples according to an embodiment of the present invention. The number of blur samples applied to the frame to blur a pixel's motion may vary based on the pixel's velocity. As shown in FIG. 4, pixels $p_1$ and $p_2$ in an application window having motion, for example induced by being resized from a first size 405 to a second size 410, may be blurred to smoothly display the motion of the window. A motion vector $MV_p$ 415 may be calculated for pixel $p_1$ in the application window, for example, as previously described with reference to FIG. 3. Motion blur may then be applied to the frame by placing blur samples 420 along the motion vector $MV_p$ 415. Similarly, a motion vector $MV_p$ 425 may be calculated for pixel $p_2$ and motion blur may be applied by placing blur samples 430 along the motion vector $MV_p$ 425. As shown, a pixel $p_1$ with a relatively long motion vector, $MV_p$ 415, may be provided with a higher number of blur samples 420 than another pixel $p_2$ with a relatively short motion vector $MV_p$ 425.

Figure 5:
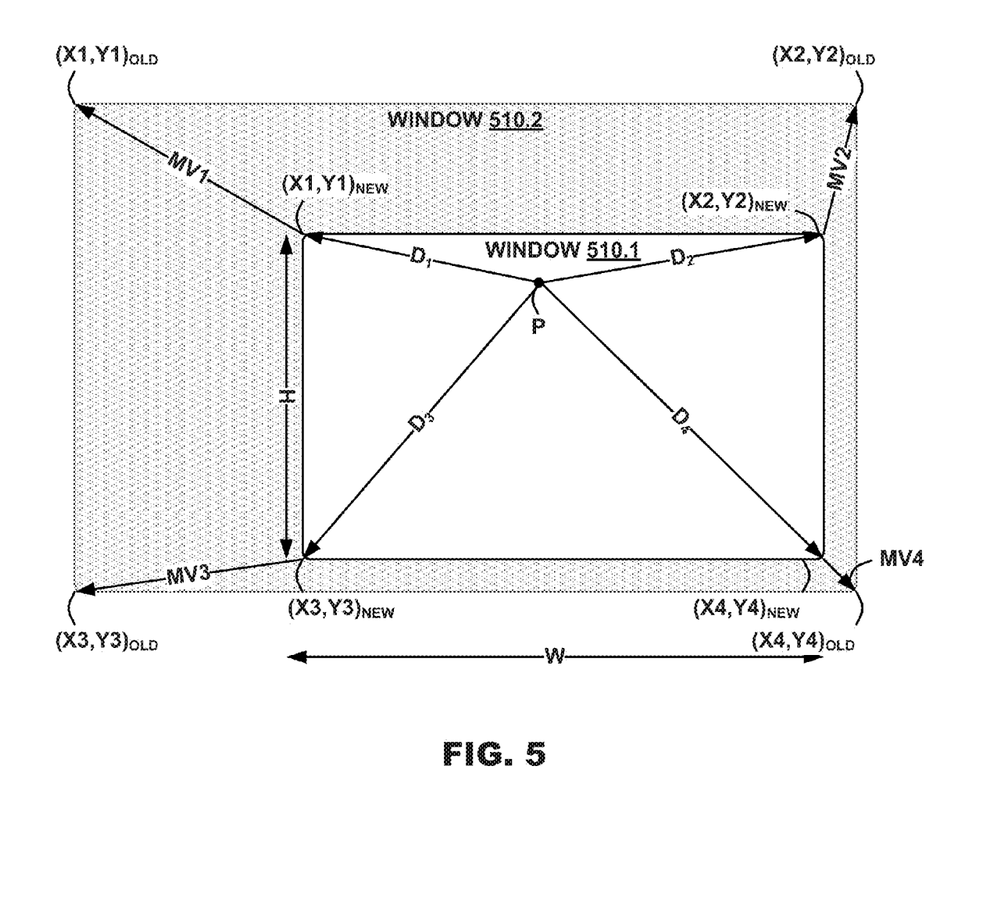
FIG. 5 illustrates an exemplary application of a method of applying motion blur according to an embodiment of the present application.

FIG. 5 illustrates an exemplary application of a method of applying motion blur according to an embodiment of the present invention. As shown, application window 510.1 may have a height of H pixels and a width of W pixels. The area of the application window 510.1 is defined by the window's corners, which are located at coordinates $(X1, Y1)_{NEW}$, $(X2, Y2)_{NEW}$, $(X3, Y3)_{NEW}$ and $(X4, Y4)_{NEW}$, respectively.

In this example, the application window 510 is shown as shrinking as compared to the window's dimensions in a previous frame. In the previous frame, application window 510.2 had corners located at coordinates $(X1, Y1)_{OLD}$, $(X2, Y2)_{OLD}$, $(X3, Y3)_{OLD}$ and $(X4, Y4)_{OLD}$, respectively. Then the computed velocity of each corner may be represented by motion vectors $MV_1$-$MV_4$ and the distance from pixel P to the corners of window 510.1 may be represented by $D_1$-$D_4$. The motion vector for pixel P ($MV_p$) may be calculated in accordance with Equation 1 as described above. Motion blur equivalent to $MV_p$ may then be applied to pixel P before the frame comprising application window 510.1 is displayed.

Figure 6:
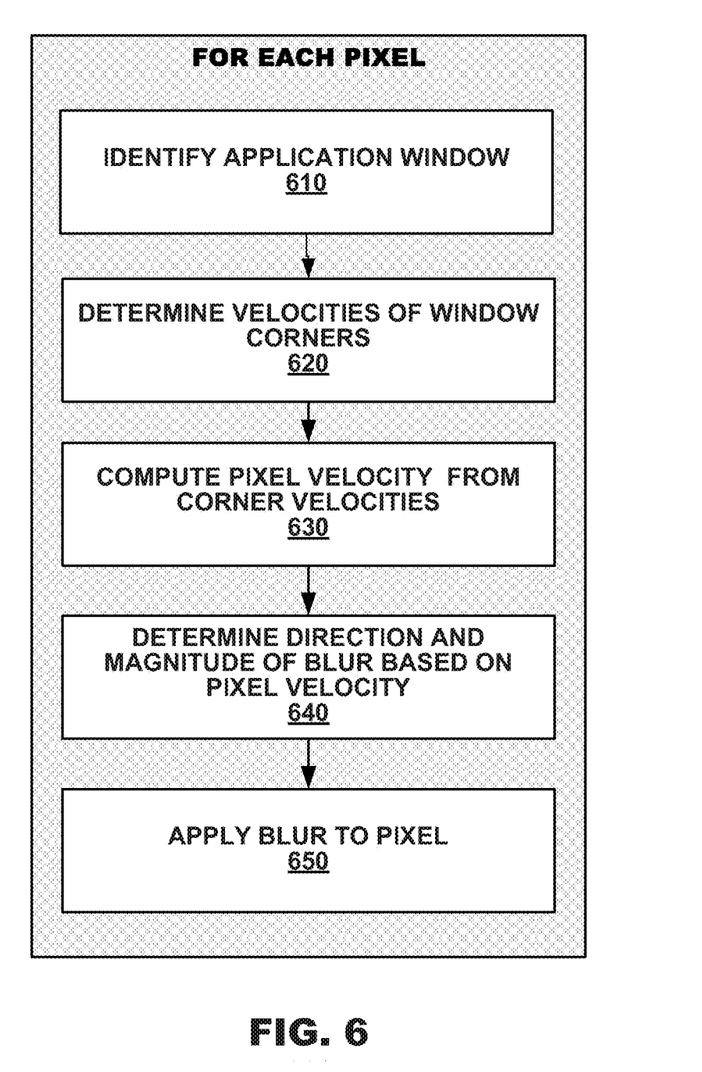
FIG. 6 illustrates a method for applying motion blur according to an embodiment of the present application.

FIG. 6 illustrates a method for applying motion blur, according to an embodiment of the present invention. Not all application windows that are stored in main memory may need to be displayed at all times. Some applications windows may be hidden by the operating system, for example, in response to operator command. Other application windows may be present within a workspace of the computer system but be obscured, either partially or entirely, by other application windows. To account for hidden or obscured windows, the method 600 may be applied to each pixel rendered in a frame for display. At the outset, for each pixel in the frame, the method 600 may identify the application window in which the pixel sits (block 610). Identifying an application window for each pixel in the frame may reduce the unnecessary processing of hidden application windows or obscured portions of the application windows. Only application windows that are at least partially displayed in the frame, and only the visible portions of the application window, will be processed according to the method 600.

Then the velocities of the corners of the application window may be determined (block 620). The velocities may be computed based on the positions of each corner in a present frame as compared to a prior frame. In an embodiment of the present invention, if the pixel is in an application window for which the corner velocities have previously been computed, the method 600 may use the previously calculated corner velocities. The determined velocities may be converted into a motion vector (MV) for each corner.

For each pixel, the method 600 may then compute the pixel's velocity as an extrapolation of the velocities of the application window's corners (box 630). The velocity of each pixel may also be expressed as a motion vector. Motion vectors of individual pixels within the application window based on the motion vectors derived for each corner may be calculated in accordance with Equation 1 as previously described.

Based on the pixel's velocity, the method 600 may then determine a direction and magnitude of blur to be applied to the pixel (box 640). Finally, the method 600 may apply the determined blur to the pixel (box 650). The determined motion blur may be applied to each pixel in a direction and magnitude that corresponds to the direction and magnitude of the pixel's motion vector.

Figure 7A:
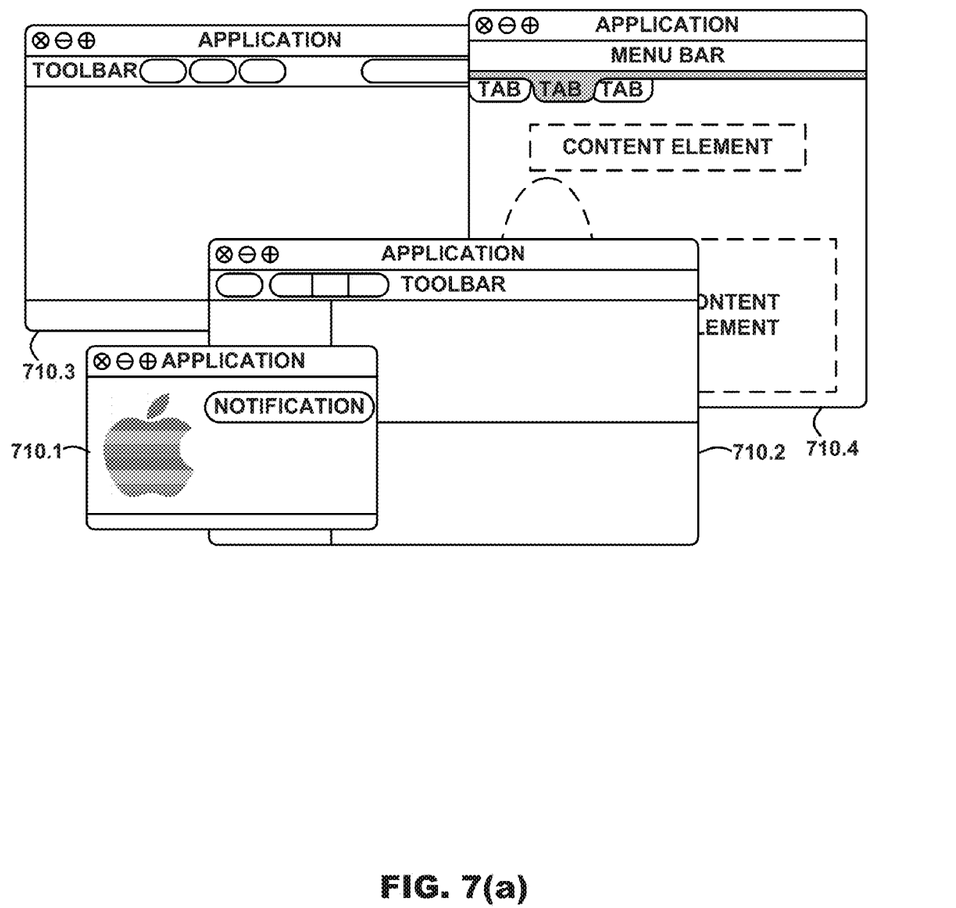
FIGS. 7(a) and 7(b) illustrate an exemplary application of a method of applying motion blur according to an embodiment of the present application.
Figure 7B:
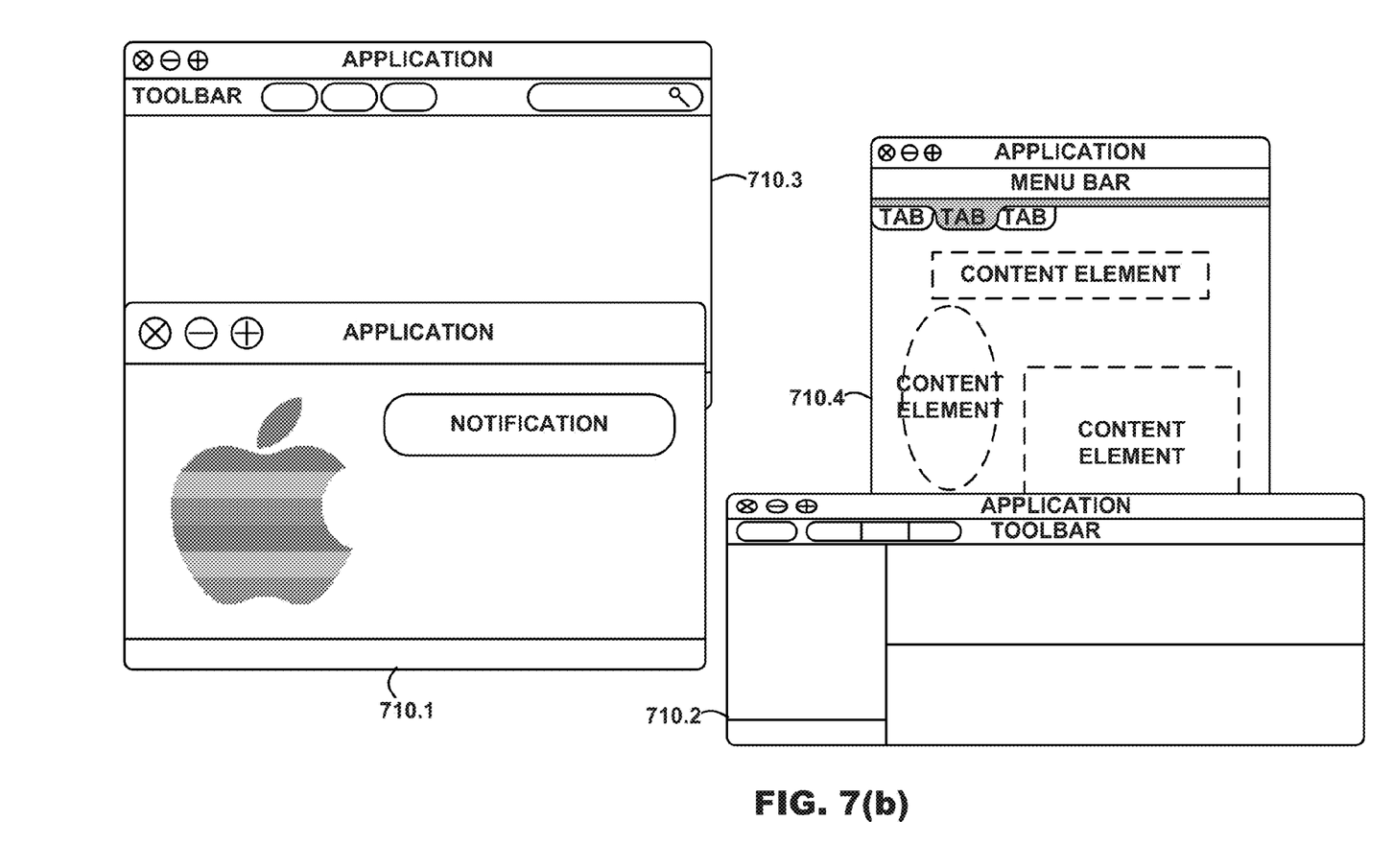

FIGS. 7(*a*) and 7(*b*) illustrate an exemplary application of a method of applying motion blur according to an embodiment of the present invention. As shown in FIG. 7(*a*), display space may include a variety of application windows 710.1-710.4 that are initially overlapping, but that are later organized into a window array that exposes all currently active windows as in FIG. 7(*b*). For each application window 710.1-710.4, the velocities of the corners of each application window may be calculated based on the positions of each corner in the latter frame as in FIG. 7(*b*) as compared to a prior frame as in FIG. 7(*a*). The computed velocities of each corner of each application window may then be converted into a motion vector for each corner. Then each pixel within each application window may be processed to compute the pixel's velocity as an extrapolation of the velocities of the application window's corners expressed as a motion vector. Based on each pixel's velocity, the direction and magnitude of blur to be applied to the pixel may be determined and applied.

As shown in FIG. 7(*a*), portions of windows 710.2, 710.3 and 710.4 are obscured by other application windows. In an embodiment, the method of FIG. 6 may omit processing of any pixel that is determined to be hidden from view in a display frame. For example, portions of application window 710.4, for example, are obscured by application window 710.2. Portions of application window 710.4 likely will continue to be obscured by window 710.2 during initial portions of an animated sequence that moves the application windows from the FIG. 7(*a*) configuration to the FIG. 7(*b*) configuration. Thus, no motion blur need be applied to the obscured portions of a moving window and the motion of each application window may be determined independent of the motion of the other windows. Operation of the method 600 of FIG. 6 may induce independently applied motion blur for multiple windows having motion.

In a further embodiment, multiple application windows may be aggregated into a common meta-object, and treated as a single window, rendered in a single blur operation when the application windows are detected as having common motion properties. Then additional motion blur for each window may be independently calculated as described above. The composite calculation may conserve additional resources.

Figure 8:
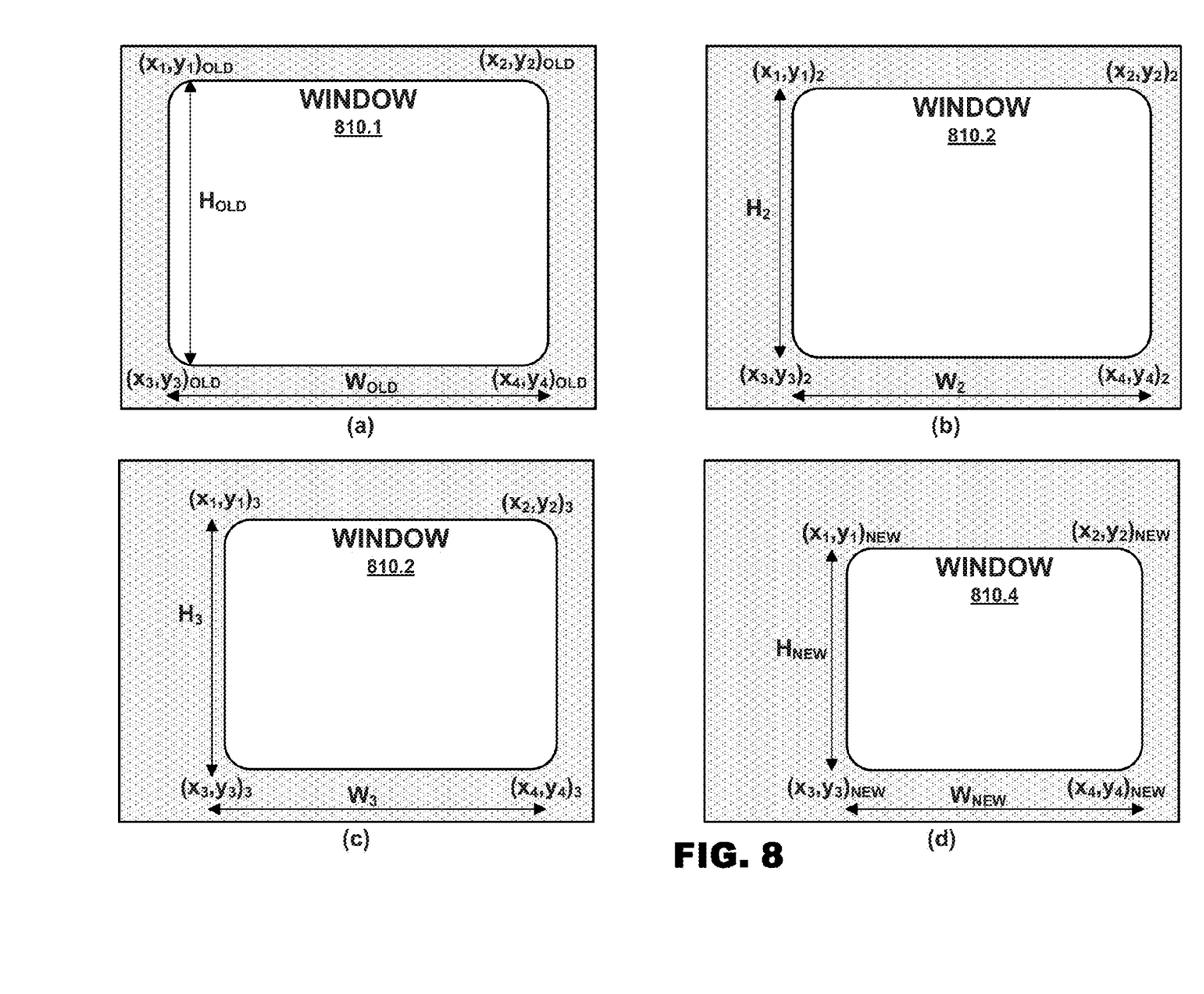
FIG. 8 illustrates an exemplary application of a method of applying motion blur according to an embodiment of the present application.

FIG. 8 illustrates another application of a method of applying motion blur to an exemplary application window. As shown, motion blur may be imparted onto an application window over a plurality of frames 8(*a*)-8(*d*). To determine the motion blur to be applied to the application window 810, beginning with frame 8(*a*) and ending with frame 8(*d*), the motion vector for the pixels of the application window 810 may be calculated in accordance with the Equation 1 as previously described. As shown, application window 810.1 may have an original height of $H_{OLD}$ pixels and a width of $W_{OLD}$ pixels. The area of the application window 810.1 is defined by the window's corners, which are located at coordinates $(X1, Y1)_{OLD}$, $(X2, Y2)_{OLD}$, $(X3, Y3)_{OLD}$ and $(X4, Y4)_{OLD}$, respectively. The motion vectors for the pixels of the application window 810 may then be calculated for the motion between corners $(X1, Y1)_{OLD}$, $(X2, Y2)_{OLD}$, $(X3, Y3)_{OLD}$ and $(X4, Y4)_{OLD}$ and corners $(X1, Y1)_{NEW}$, $(X2, Y2)_{NEW}$, $(X3, Y3)_{NEW}$ and $(X4, Y4)_{NEW}$. The total calculated motion blur may then be implemented incrementally over frames 8(*b*) and 8(*c*) without further calculation.

In this example, the application window 810.1 is shown as shrinking as compared to the window's dimensions in a previous frame. Thus, in the subsequent frame, application window 810.2 had corners located at coordinates $(X1, Y1)_2$, $(X2, Y2)_2$, $(X3, Y3)_2$ and $(X4, Y4)_2$, respectively. Then in the next subsequent frame, application window 810.3 had corners located at coordinates $(X1, Y1)_3$, $(X2, Y2)_3$, $(X3, Y3)_3$ and $(X4, Y4)_3$, respectively. And in the final frame, application window 810.4 may have a height of $H_{NEW}$ pixels and a width of $W_{NEW}$ pixels. The area of the application window 810.4 is defined by the window's corners, which are located at coordinates $(X1, Y1)_{NEW}$, $(X2, Y2)_{NEW}$, $(X3, Y3)_{NEW}$ and $(X4, Y4)_{NEW}$, respectively.

Figure 9:
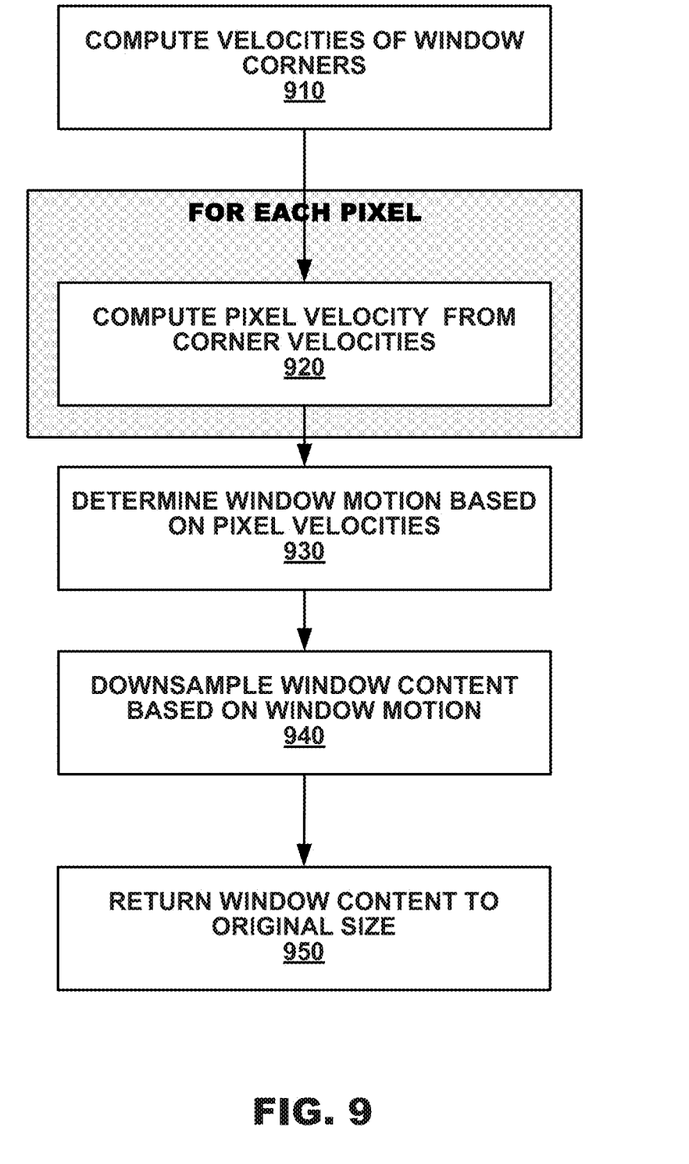
FIG. 9 illustrates a method for applying motion blur according to an embodiment of the present application.

FIG. 9 illustrates a method 900 for applying motion blur according to an embodiment of the present application. The method 900 may be applied to each application window rendered in a frame for display. As shown in FIG. 9, motion blur for an application window may be applied by performing directional downsampling of image content within the application window and then upsampling to return the image content to the original size.

The method 900 may initially compute the velocities of the corners of the application window (box 910). The velocities may be computed based on the positions of each corner in a present frame as compared to a prior frame. The computed velocities of each corner may then be converted into a motion vector (MV) for each corner. Then, for each pixel within the application window, the method 900 may compute the pixel's velocity as an extrapolation of the velocities of the application window's corners (box 920). The velocity of each pixel may also be expressed as a motion vector, calculated in accordance with Equation 1 as previously described.

Based on the calculated pixel velocities, the method 900 may then determine the motion existent in the application window, for example, by determining an average pixel velocity, by combining all of the pixel velocities to determine the total motion velocity, or by determining the maximum and minimum pixel velocities for the pixels in the application window (box 930). Then, the method 900 may downsample the content of the application window to apply motion blur to the pixel in accordance with the determined motion (box 940).

With downsampling, the image content in the application window may be spatially downsampled to reduce or eliminate a portion of the data associated with the image content. Then the image content may be returned to the original size, for example by interpolating the pixel data necessary to display the re-expanded image content (block 950). The process of downsampling and re-upsampling the image content may cause a deterioration in the image resolution from averaging of the pixel content during interpolation. This loss of image resolution may result in an appropriate motion blur for the application window.

The degree to which an application window is downsampled may vary based on relative motion of the application window. A window with relatively low motion, as determined by the size of the motion vectors calculated for the pixels in the application window, may be minimally downsampled, or not downsampled at all. A window with relatively high motion, as determined by the size of the motion vectors calculated for the pixels in the application window, may be downsampled more heavily.

The foregoing discussion identifies functional blocks that may be used in image display systems constructed according to various embodiments of the present invention. In practice, these systems may be applied in a variety of devices, such as personal computing systems and/or mobile devices. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, not all of the functional blocks described herein need be provided or need be provided as separate units. For example, although FIG. 1 illustrates the components of an exemplary computing system, such as the CPU 110, the GPU 140, the main memory 120 and the video memory 150 as separate units, in one or more embodiments, some or all of them may be integrated. Such implementation details are immaterial to the operation of the present invention unless otherwise noted above.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A computer implemented method for applying blur to an application window comprising:
    calculating, with a processor, a velocity vector for each corner of the application window from a first frame to a second frame stored in a computer memory; and
    for each pixel in the application window:
        calculating, with the processor, a first velocity vector for the pixel based, at least in part, on an extrapolation of the velocity vectors for each corner, wherein the calculation for a respective pixel is not performed if it is located in a hidden or obscured portion of the application window; and
        blurring the pixel according to the first velocity vector, wherein the blurring of the pixel comprises placing a plurality of blur samples along the first velocity vector for the pixel.

2. The method of claim 1, further comprising determining a blur magnitude for each pixel using the first velocity vector for the respective pixel.

3. The method of claim 1, wherein the pixel is blurred over a plurality of frames between the first frame and the second frame.

4. The method of claim 1, wherein the number of samples in the plurality of blur samples is a variable determined by a magnitude of the first velocity vector for the pixel.

5. The method of claim 1, wherein the pixel is blurred by directionally downsampling then re-upsampling content of the second frame.

6. The method of claim 1, further comprising, for a frame comprising a plurality of application windows, blurring the pixels of each application window independently of the other application windows in the frame.

7. The method of claim 1, further comprising, for a frame comprising a plurality of application windows, blurring the pixels of the plurality of application windows together with other application windows in the frame.

8. A computer implemented method for applying blur to a frame stored in a computer memory comprising:
    for each pixel in a first frame stored in the computer memory:
        identifying, with a processor, an associated application window;
        determining, with the processor, a velocity vector for each corner of the associated application window from the first frame to a second frame stored in the computer memory;
        calculating, with the processor, a first velocity vector for the pixel based, at least in part, on an extrapolation of the velocity vectors for each corner, wherein the calculation for the pixel is not performed if it is located in a hidden or obscured portion of the associated application window; and
        blurring the pixel in the first frame according to the first velocity vector, wherein the blurring of the pixel comprises placing a plurality of blur samples along the first velocity vector for the pixel.

9. A computer implemented method for applying blur to an application window stored in a computer memory comprising:
    calculating, with a processor, a velocity vector for each corner of the application window from a first frame to a second frame stored in a computer memory; and
    for a plurality of pixels in the application window:
        calculating, with the processor, a first velocity vector for each pixel based, at least in part, on an extrapolation of the velocity vectors for each corner, wherein the calculation for a respective pixel is not performed if it is located in a hidden or obscured portion of the application window;
        determining a motion value for the application window based, at least in part, on the first velocity vectors of the plurality of pixels;

directionally downsampling the application window from a first size to a second size, according to the motion value, wherein the application window is directionally downsampled, at least in part, by placing a plurality of blur samples in the application window in accordance with the determined motion value; and returning the application window to the first size.

10. An image display system comprising:
a memory to store a plurality of frames, each frame comprising an application window; and
a processor operable to:
calculate a velocity vector for each corner of the application window from a first frame stored in the memory to a second frame stored in the memory;
calculate a first velocity vector for each pixel in the application window based, at least in part, on an extrapolation of the velocity vectors for each corner, wherein the calculation for a respective pixel is not performed if it is located in a hidden or obscured portion of the application window; and
blur each pixel in the second frame according to the first velocity vector of the pixel, wherein the blurring of each pixel comprises placing a plurality of blur samples along the first velocity vector for the pixel.

11. The system of claim 10, wherein the processor determines a blur magnitude for each pixel using the first velocity vector for the respective pixel.

12. The system of claim 10, wherein the processor blurs the pixel over a plurality of frames between the first frame and the second frame.

13. The system of claim 10, wherein the number of samples in the plurality of blur samples is a variable determined by the magnitude of the first velocity vector for the pixel.

14. The system of claim 10, wherein the processor blurs the pixel by directionally downsampling then re-upsampling content of the second frame.

15. The system of claim 10, wherein for a frame comprising a plurality of application windows, the processor blurs the pixels of each application window independently of the other application windows in the frame.

16. The system of claim 10, wherein for a frame comprising a plurality of application windows, the processor blurs the pixels of the plurality of application windows together with other application windows in the frame.

17. An image display system comprising:
a memory to store display data of a plurality of frames, each frame associated with at least one application window; and
a processor operable to:
for a first frame stored in the memory:
determine a velocity vector for each corner of one of the at least one associated application windows from the first frame to a second frame stored in the memory;
calculate a first velocity vector for each pixel in the frame based, at least in part, on an extrapolation of the velocity vectors for each corner, wherein the calculation for a respective pixel is not performed if it is located in a hidden or obscured portion of any of the at least one application windows; and
blur each pixel in the second frame according to the first velocity vector of the pixel, wherein the blurring of each pixel in the second frame comprises placing a plurality of blur samples along the first velocity vector for the pixel.

18. The system of claim 17, wherein the processor is a graphics processing unit and the memory is a video frame buffer.

19. The system of claim 18, further comprising:
a second processor to execute application programs,
a second memory to store displayable output of the application programs as application windows,
wherein the graphics processing unit generates frame data from the application window data of the second memory.

20. An image display system comprising:
a memory to store a plurality of frames, each frame comprising an application window; and
a processor operable to:
calculate a velocity vector for each corner of the application window from a first frame stored in the memory to a second frame stored in the memory;
calculate a first velocity vector for a plurality of pixels in the application window based, at least in part, on an extrapolation of the velocity vectors for each corner, wherein the calculation for a respective pixel is not performed if it is located in a hidden or obscured portion of the application window;
determine a motion value for the application window based, at least in part, on the first velocity vectors of the plurality of pixels;
directionally downsample the application window from a first size to a second size, based, at least in part, on the motion value, wherein the application window is directionally downsampled, at least in part, by placing a plurality of blur samples in the application window in accordance with the determined motion value; and
return the application window to the first size.

21. The system of claim 20, wherein the processor is a graphics processing unit and the memory is a video frame buffer.

22. The system of claim 21, further comprising:
a second processor to execute application programs,
a second memory to store displayable output of the application programs as application windows,
wherein the graphics processing unit generates frame data from the application window data of the second memory.

23. The computer system of claim 21, further comprising a display to display frame data having blur applied to application windows.

24. A computer system, comprising:
a central processing unit to execute application programs,
a main memory to store display data of the application programs as application window data,
a graphics processing unit to generate frame data from data of displayable application windows, and
a video memory to store the frame data,
wherein the graphics processing unit applies blur to representations of application windows in the frame data according to inter-frame motion of the application windows derived from an extrapolation of velocity vectors of each of the application window's corners between frames, wherein applying the blur comprises placing a plurality of blur samples along a vector representing the extrapolation of the velocity vectors of each of the application window's corners, and wherein the calculation for a respective pixel is not performed if it is located in a hidden or obscured portion of the application window.

* * * * *